(12) United States Patent
Wakimoto (10) Patent No.: US 10,289,220 B2
(45) Date of Patent: May 14, 2019

(54) ELECTRONIC DEVICE, AND METHOD OF CONTROLLING ELECTRONIC DEVICE

(71) Applicant: SEIKO EPSON CORPORATION, Tokyo (JP)

(72) Inventor: Shingo Wakimoto, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 249 days.

(21) Appl. No.: 15/450,593

(22) Filed: Mar. 6, 2017

(65) Prior Publication Data

US 2017/0269710 A1  Sep. 21, 2017

(30) Foreign Application Priority Data

Mar. 16, 2016  (JP) ................................. 2016-052046

(51) Int. Cl.
| | | |
|---|---|---|
| *G06F 3/038* | (2013.01) | |
| *G06F 1/3215* | (2019.01) | |
| *G06F 1/3234* | (2019.01) | |
| *G06F 3/0354* | (2013.01) | |
| *G06F 3/044* | (2006.01) | |
| *G06F 3/042* | (2006.01) | |

(52) U.S. Cl.
CPC ............ *G06F 3/038* (2013.01); *G06F 1/3215* (2013.01); *G06F 1/3259* (2013.01); *G06F 3/03545* (2013.01); *G06F 3/044* (2013.01); *G06F 3/0425* (2013.01); *Y02D 10/155* (2018.01)

(58) Field of Classification Search
CPC .. G06F 1/3215; G06F 1/3259; G06F 3/03545; G06F 3/038; G06F 3/0425; G06F 3/044; Y02D 10/155
See application file for complete search history.

(56) References Cited

U.S. PATENT DOCUMENTS

| | | | | |
|---|---|---|---|---|
| 8,736,116 B2* | 5/2014 | Yoshie | ...................... | G06F 1/26 307/125 |
| 8,820,945 B2* | 9/2014 | Tsukagoshi | .............. | G03B 3/12 353/100 |
| 2014/0333590 A1 | 11/2014 | Hirata et al. | | |

FOREIGN PATENT DOCUMENTS

WO  2013/114453 A1  8/2013

* cited by examiner

*Primary Examiner* — Insa Sadio
(74) *Attorney, Agent, or Firm* — Oliff PLC (57) ABSTRACT

A pointing object is provided with a first sensor (a first detection section) adapted to detect that the pointing object has been held, a detection circuit section (a second detection section) adapted to detect that a first operation switch has been operated, and a pointing object control section capable of switching an operation mode of the pointing object between a normal operation mode (a first operation mode) in which the pointing object operates in an operation state suitable for a usage, and a power saving mode (a second operation mode) with a power consumption reduced to a level lower than in the normal operation mode, and adapted to switch the operation mode based on a detection result of the first sensor and a detection result of an operation of the first operation switch.

9 Claims, 6 Drawing Sheets

ELECTRONIC DEVICE, AND METHOD OF CONTROLLING ELECTRONIC DEVICE

The entire disclosure of Japanese Patent Application No. 2016-052046, filed Mar. 16, 2016 is expressly incorporated by reference herein.

BACKGROUND

1. Technical Field

The present invention relates to an electronic device and a method of controlling the electronic device.

2. Related Art

There has been known an electronic device used when adding information such as a diagram or a character to an image projected by a projector. This kind of electronic device is provided with a light emitting element formed to have a pen shape held by a user when used, and adapted to emit a light beam, and a sensor or the like for outputting information representing whether or not a tip part of a pen and a writing object surface have contact with each other (see, e.g., International Publication No. WO 2013/114453).

Incidentally, with a view of reduction of the power consumption of an electronic device, it is possible to provide a power saving mode in which the power consumption is reduced compared to a normal operation mode, and perform the control of switching the operation mode in accordance with the detection result of a sensor for detecting holding by the user.

However, if there occurs the situation in which accurate sensing cannot be achieved due to the deterioration of the sensitivity of the sensor or the like, there is a possibility that it becomes unachievable to switch the operation mode from the power saving mode to the normal operation mode. For example, in the case of adopting a configuration of detecting whether or not holding by the user is achieved using an electrostatic sensor, if the user wears gloves, there is a possibility that it is unachievable to detect that the holding by the user has been achieved. In this case, it is unachievable to instantly switch the operation mode to the normal operation mode, and thus the usability is impaired.

SUMMARY

An advantage of some aspects of the invention is to make it easy to achieve the improvement of the usability and the reduction of the power consumption.

An aspect of the invention is directed to an electronic device having a main body part to be held by a user, and including a first detection section adapted to detect that the main body part has been held, an operation section adapted to accept an operation, a second detection section adapted to detect that the operation section has been operated, and a control section capable of switching an operation mode of the electronic device between a first operation mode in which the electronic device operates in an operation state suitable for a usage, and a second operation mode with a power consumption reduced to a level lower than in the first operation mode, and adapted to switch the operation mode based on a detection result of the first detection section and a detection result of the second detection section.

According to the aspect of the invention, even in the case in which the first detection section for detecting that the main body part has been held becomes not to be able to detect the hold of the main body part due to the deterioration of the sensitivity, the change in usage environment, or the like, it is possible to switch the operation mode using the detection result of the second detection section for detecting that the operation section has been operated. Therefore, it is possible to achieve the reduction of the power consumption while achieving the improvement of the usability.

Another aspect of the invention is directed to the configuration described above, in which the control section switches the operation mode to the first operation mode in a case in which the first detection section has detected that the main body part has been held, and in a case in which the second detection section has detected that the operation section has been operated in the second operation mode.

According to the aspect of the invention, in the case in which the main body part has been held and in the case in which the operation section has been operated, the electronic device can be switched to the first operation mode suitable for a usage.

Another aspect of the invention is directed to the configuration described above, in which the control section switches the operation mode to the second operation mode in a case in which predetermined time has elapsed in a state in which the first detection section has failed to detected that the main body part has been held, and the second detection section has failed to detect that the operation section has been operated in the first operation mode.

According to the aspect of the invention, in the state in which the main body part is not held, and the operation section is not operated, namely in the case in which predetermined time has elapsed in the state in which the user does not use the electronic device, it is possible to perform switching to the second operation mode. Thus, the reduction of the power consumption can be achieved.

Another aspect of the invention is directed to the configuration described above, in which the control section sets first time as the predetermined time in a case in which the first detection section has detected that the main body part has been held, and sets second time longer than the first time as the predetermined time in a case in which the first detection section has failed to detect that the main body part has been held, and the second detection section has detected that the operation section has been operated.

In the configuration in which it is assumed that the operation of the operation section is performed while holding the main body part, it can be assumed that there occurs the condition that the first detection section fails to detect the hold of the main body part in the case in which the hold of the main body part is not detected despite that the operation of the operation section has been detected. In such a condition, it becomes that the switching from the second operation mode to the first operation mode does not occur only by holding the main body part, and in order to perform switching to the first operation mode, there arises a necessity of operating the operation section.

According to the aspect of the invention, in the case in which the hold of the main body part has not been detected and the operation of the operation section has been detected, the time until switching to the second operation mode occurs is set longer than in the case in which the hold of the main body part has been detected. Therefore, it can be prevented that switching to the second operation mode frequently occurs despite that the main body part is held.

Another aspect of the invention is directed to the configuration described above, in which the first detection section has a strain sensor adapted to detect strain of the main body part.

According to the aspect of the invention, whether or not the main body part is gripped by the user can accurately be detected using the strain sensor for detecting the strain of the main body part.

Another aspect of the invention is directed to the configuration described above, in which the first detection section has an acceleration sensor adapted to detect acceleration of the main body part.

According to the aspect of the invention, the acceleration generated by the motion of the user who holds the main body part can be detected by the acceleration sensor, and whether or not the main body part is held by the user can accurately be detected.

Another aspect of the invention is directed to the configuration described above, in which the first detection section has an electrostatic sensor adapted to detect a variation of a capacitance.

According to the aspect of the invention, whether or not the main body part is held by the user can accurately be detected using the electrostatic sensor for detecting the change in capacitance.

Another aspect of the invention is directed to the configuration described above, in which the electronic device further includes a transmitting section adapted to transmit a wireless signal to an external device, in which the transmitting section becomes to be able to transmit the wireless signal in a case in which the control section has switched the operation mode to the first operation mode.

According to the aspect of the invention, in the case of the first operation mode, it is possible to transmit the wireless signal to an external device.

Another aspect of the invention is directed to a method of controlling an electronic device having a main body part to be held by a user, the method including performing control of switching an operation mode between a first operation mode in which the electronic device operates in an operation state suitable for a usage, and a second operation mode with a power consumption reduced to a level lower than in the first operation mode, and switching the operation mode based on a detection result of the first detection section adapted to detect that the main body part has been held, and a detection result of the second detection section adapted to detect that an operation section has been operated.

According to the aspect of the invention, even in the case in which the first detection section for detecting that the main body part has been held becomes not to be able to detect the hold of the main body part due to the deterioration of the sensitivity, the change in usage environment, or the like, it is possible to switch the operation mode using the detection result of the second detection section for detecting that the operation section has been operated. Therefore, it is possible to achieve the reduction of the power consumption while achieving the improvement of the usability.

BRIEF DESCRIPTION OF THE DRAWINGS

The invention will now be described with reference to the accompanying drawings, wherein like numbers reference like elements.

DESCRIPTION OF AN EXEMPLARY EMBODIMENT

An embodiment of the invention will hereinafter be described with reference to the accompanying drawings.

Figure 1:
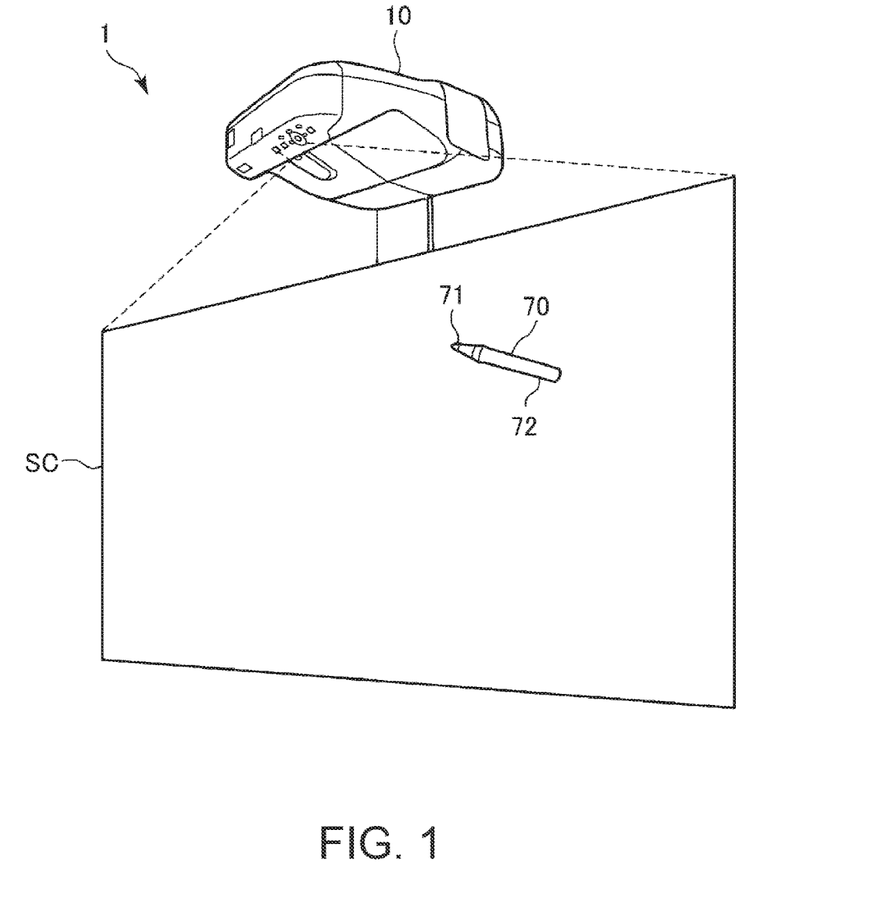
FIG. 1 is a diagram showing a configuration of a projection system capable of using a pointing object according to an embodiment of the invention.

FIG. 1 is a diagram showing a configuration of a projection system 1 capable of using a pointing object 70 according to the embodiment of the invention.

The projection system 1 is provided with a projector 10 for projecting an image on a screen SC (a projection surface). The projector 10 is disposed directly above or obliquely above the screen SC, and projects an image toward the screen SC located obliquely below. The screen SC is a flat plate or a curtain fixed to a wall surface, or erected on the floor surface. The invention is not limited to this example, but it is also possible to use the wall surface as the screen SC. In this case, it is advisable to attach the projector 10 to an upper part of the wall surface used as the screen SC.

The projector 10 is connected to an external image supply device such as a personal computer (PC), a video reproduction device, or a DVD reproduction device, and projects an image on the screen SC based on an analog image signal or digital image data supplied from the image supply device. Further, it is also possible for the projector 10 to have a configuration of reading out image data stored in a storage section 35 (FIG. 2) incorporated in the projector 10 or in a storage medium externally connected to the projector 10, and then displaying an image on the screen SC based on the image data.

The pointing object 70 is a user-operated device for the user to perform the pointing operation to the screen SC. The pointing object 70 is an electronic device incorporating an electronic component such as a light emitting section 86 (FIG. 4), and by the projector 10 detecting the light from the light emitting section 86, it is possible for the projector 10 to detect the position pointed by the user. This pointing object 70 will be described later.

The projection system 1 functions as an interactive whiteboard system, and performs a process of detecting a pointing operation performed by the user with the pointing object 70 to reflect the pointed position on the projection image.

Specifically, the projection system 1 performs a process of drawing a figure or disposing a character or a symbol at the pointed position, a process of drawing a figure along the trajectory of the pointed position, a process of erasing the figure thus drawn and the character or the symbol thus disposed, and so on. Further, the figure drawn on the screen SC and the character or the symbol disposed on the screen SC can also be stored as the image data, and can also be output to an external device.

Further, it is also possible for the projection system 1 to use the pointing object 70 as a pointing device to detect the pointed position of the pointing object 70 in the image projection area in which the projector 10 projects an image on the screen SC, and then output the coordinate. Further, it is also possible to perform the GUI (graphical user interface) operation using this coordinate.

Figure 2:
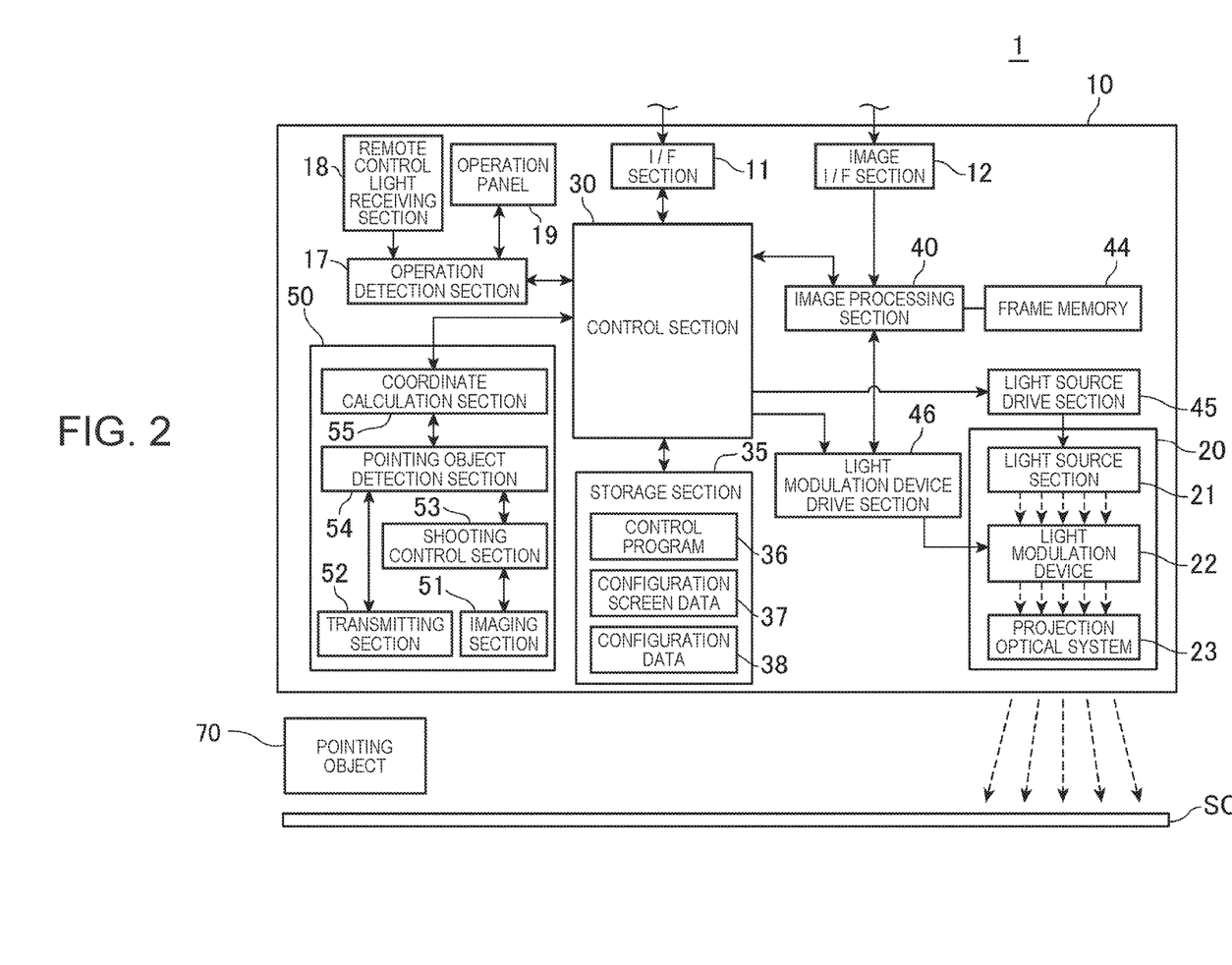
FIG. 2 is a functional block diagram showing a projector together with a peripheral configuration.

FIG. 2 is a functional block diagram showing the projector 10 together with a peripheral configuration.

The projector 10 is provided with an I/F (interface) section 11 and an image I/F (interface) section 12 as interfaces to be connected to external devices. The I/F section 11 and the image I/F section 12 can also be provided with connecters for wired connection, and each can be provided with an interface circuit compatible with the connector described above. Further, the I/F section 11 and the image I/F section 12 each can also be provided with a wireless communication interface. For example, the connector and the interface circuit for the wired connection are those compliant to wired LAN, IEEE1394, USB, or the like. Further, the wireless communication interface are those compliant to, for example, wireless LAN, or Bluetooth (registered trademark). As the image I/F section 12, there can also be used an interface for image data such as an HDMI (registered trademark) interface, DisplayPort (trademark), or CoaXPress (trademark). The image I/F section 12 can also be provided with an interface through which sound data is input.

The I/F section 11 is an interface for transmitting and receiving a variety of types of data with an external device such as a PC. The I/F section 11 inputs and outputs control data related to projection of an image, data for setting the operation of the projector 10, coordinate data of the pointed position detected by the projector 10, and so on. The control section 30 of the projector 10 has a function of transmitting and receiving the data with the external device via the I/F section 11.

The image I/F section 12 is an interface through which the digital image data is input. The projector 10 according to the present embodiment projects an image based on the digital image data input via the image I/F section 12. It should be noted that the projector 10 can also be provided with a function of projecting an image based on an analog signal. In this case, it is also possible to provide the image I/F section 12 with an interface for the analog image signal, and an A/D conversion circuit for converting the analog image signal into digital image data.

The projector 10 is provided with a projection section 20 for performing formation of an optical image. The projection section 20 is provided with a light source section 21, a light modulation device 22, and a projection optical system 23. The light source section 21 is provided with a discharge lamp light source such as a light source formed of a xenon lamp or a super-high pressure mercury lamp, or a solid-state light source such as a light emitting diode (LED) or a laser source. The light source section 21 can also be provided with a reflector and an auxiliary reflector for guiding the light emitted by the light source to the light modulation device 22. Further, the light source section 21 can also be provided with a lens group for improving the optical characteristics of the projection light, a polarization plate, a dimming element for reducing the light intensity of the light emitted by the light source on a path leading to the light modulation device 22, and so on (all not shown).

The light modulation section 22 modulates the light emitted from the light source 21 to generate image light, and then outputs the image light to the projection optical system 23. The light modulation device 22 is formed of, for example, three transmissive liquid crystal panels or three reflective liquid crystal panels corresponding respectively to the three primary colors of RGB. On this occasion, the light emitted from the light source 21 is separated into colored light beams of three colors of RGB, and the colored light beams respectively enter the corresponding liquid crystal panels. On the three liquid crystal panels, there are respectively drawn images by a light modulation device drive section 46, and the image light is generated by these liquid crystal panels. The colored light beams having been modulated by the respective liquid crystal panels are combined by a combining optical system such as a cross dichroic prism, and are then emitted to the projection optical system 23.

Further, the light modulation device 22 can be provided with a configuration of modulating the light emitted by the light source section 21 using a digital mirror device (DMD). For example, the light modulation device 22 is provided with a color wheel having color filters for converting the light emitted by the light source section 21 into the light beams of the three primary colors of RGB, the DMD for modulating the light having been transmitted through the color wheel, and an optical system for guiding the light and the light beams to the color wheel and the DMD, respectively. The light modulation device drive section 46 draws the image on the DMD in sync with the rotation of the color wheel. The light emitted by the light source section 21 is transmitted through the color wheel to become the light beams of the primary colors, then modulated by the DMD, and then guided to the projection optical system 23.

The projection optical system 23 is provided with a lens group for guiding the image light, which has been modulated by the light modulation device 22, toward the screen SC to form the image on the screen SC. Further, the projection optical system 23 can also be provided with a zoom mechanism for performing expansion/contraction and an adjustment of the focus of the projection image on the screen SC, or a focus adjustment mechanism for performing an adjustment of the focus. In the case in which the projector 10 is of a short focus type, the projection optical system 23 can also be provided with a concave mirror for reflecting the image light toward the screen SC.

To the projection section 20, there are connected a light source drive section 45 for lighting the light source section 21 in accordance with the control by the control section 30, and the light modulation device drive section 46 for operating the light modulation device 22 in accordance with the control by the control section 30. The light source drive section 45 can also be provided with a function of switching between lighting and extinction of the light source section 21 to control the light intensity of the light source section 21.

The projector 10 is provided with an image processing system for processing the image to be projected by the projection section 20. The image processing system includes the control section 30 for controlling the projector 10, the storage section 35, an operation detection section 17, an image processing section 40, the light source drive section 45, and the light modulation device drive section 46. Further, a frame memory 44 is connected to the image processing section 40, and a position detection section 50 is connected to the control section 30. It is also possible to include these sections in the image processing system.

The control section 30 executes a predetermined control program 36 to thereby control each of the sections of the projector 10. The storage section 35 stores the control program 36 executed by the control section 30 and data processed by the control section 30 in a nonvolatile manner. The storage section 35 stores configuration screen data 37 of a screen for setting the operation of the projector 10, configuration data 38 showing the content set using the configuration screen data 37, and so on.

The image processing section 40 processes the image data, which is input via the image I/F section 12, in accordance with the control by the control section 30, and then outputs an image signal to the light modulation device drive section 46. The processes performed by the image processing section 40 are a discrimination process between a 3D (stereoscopic) image and a 2D (planar) image, a resolution conversion process, a frame rate conversion process, a distortion correction process, a digital zoom process, a color compensation process, a luminance correction process, and so on. The image processing section 40 performs the process designated by the control section 30, and performs the process using a parameter input from the control section 30 when needed. Further, it is obviously possible to perform two or more of the processes described above in combination with each other.

The image processing section 40 develops the image data input from the image I/F section 12 on the frame memory 44, and then performs the variety of processes described above on the image data thus developed. The image processing section 40 reads out the image data having been processed from the frame memory 44, generates image signals of R, G, and B corresponding to the image data, and then outputs the image signals to the light modulation device drive section 46.

The light modulation device drive section 46 is connected to the liquid crystal panels of the light modulation device 22. The light modulation device drive section 46 drives the liquid crystal panels based on the image signals input from the image processing section 40 to draw the images on the respective liquid crystal panels.

The operation detection section 17 is connected to a remote control light receiving section 18 and the operation panel 19 each functioning as an input device to detect the operation via the remote control light receiving section 18 and the operation panel 19.

The remote control light receiving section 18 receives an infrared signal transmitted by the remote controller (so called RC) not shown used by the user of the projector 10 in accordance with the user operation. The remote control light receiving section 18 decodes the infrared signal received from the remote controller described above to generate operation data representing the operation content in the remote controller, and then outputs the operation data to the control section 30.

The operation panel 19 is disposed on the exterior housing of the projector 10, and is provided with a variety of switches. The operation detection section 17 detects the operation of the variety of switches, and then outputs the operation signal corresponding to the switch thus operated to the control section 30.

The position detection section 50 functions as an operation detection unit for detecting the operation by the pointing object 70. The position detection section 50 is provided with an imaging section 51, a transmitting section 52, a shooting control section 53, a pointing object detection section 54, and a coordinate calculation section 55.

The imaging section 51 has an imaging optical system, an imaging element, an interface circuit, and so on, and shoots the projection direction of the projection optical system 23. The imaging optical system of the imaging section 51 is disposed so as to face to the same direction as the projection optical system 23, and has a field angle of covering a range in which the projection optical system 23 projects the image on the screen SC. The imaging element is a CCD, a CMOS, or the like capable of receiving the light (infrared light in the present embodiment) emitted by the pointing object 70. The imaging section 51 can also be provided with a filter for partially blocking the light entering the imaging element, and it is also possible to dispose a filter for mainly transmitting the light in the infrared region in front of the imaging element, for example, in the case of receiving the infrared light. Further, the interface circuit of the imaging section 51 reads out and then outputs the detection value of the imaging element.

The shooting control section 53 makes the imaging section 51 perform shooting to thereby form shot image data. When the imaging element performs shooting with visible light, the image projected on the screen SC is shot. This shot image is used in, for example, a distortion correction process for correcting the keystone distortion or the pin-cushion distortion of the projection image. Further, the shooting control section 53 can shoot the infrared light with the imaging section 51, and the light (the infrared light in the present embodiment) emitted by the pointing object 70 shows up in the shot image in this case.

The pointing object detection section 54 detects the pointed position of the pointing object 70 based on the shot image data shot by the shooting control section 53. The pointing object detection section 54 detects an image of the light emitted by the pointing object 70 from the shot image data in the case in which the shooting control section 53 performs shooting with the imaging section 51.

The coordinate calculation section 55 calculates the coordinate of the pointed position by the pointing object 70 in the shot image data based on the position of the image detected by the pointing object detection section 54, and then outputs the result to the control section 30. It should be noted that it is also possible for the coordinate calculation section 55 to convert the coordinate in the shot image data thus calculated into the coordinate in the image data drawn by the image processing section 40 on the frame memory 44, or the coordinate in the input image data of the image I/F section 12, and then output the result.

The transmitting section 52 transmits the infrared signal (a wireless signal) to the pointing object 70 in accordance with the control by the pointing object detection section 54. The transmitting section 52 has a light source such as an infrared LED, and puts ON and OFF the light source in accordance with the control by the pointing object detection section 54.

Then, the pointing object 70 will be described.

Figure 3:
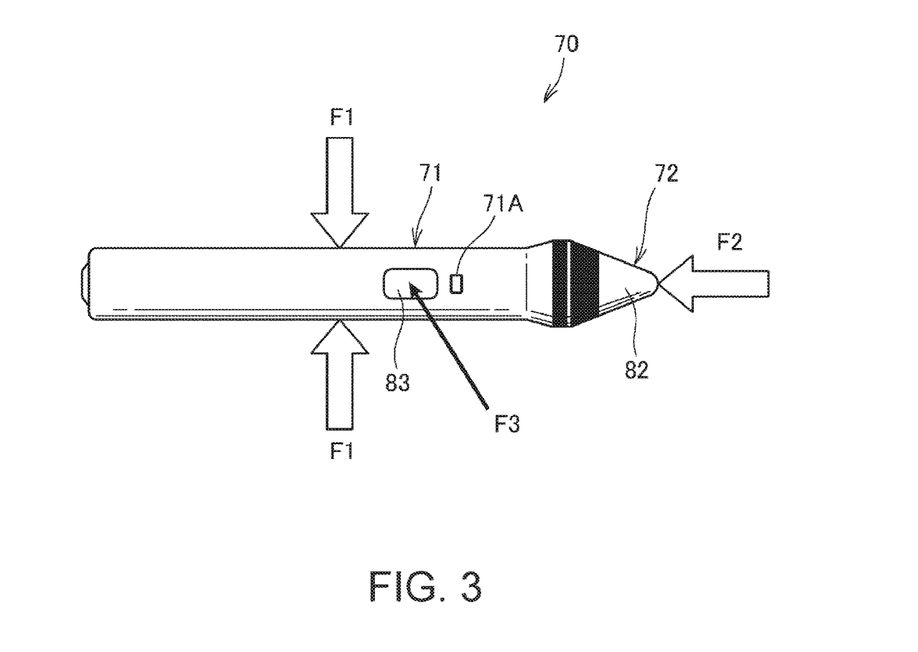
FIG. 3 is an external view of the pointing object.
Figure 4:
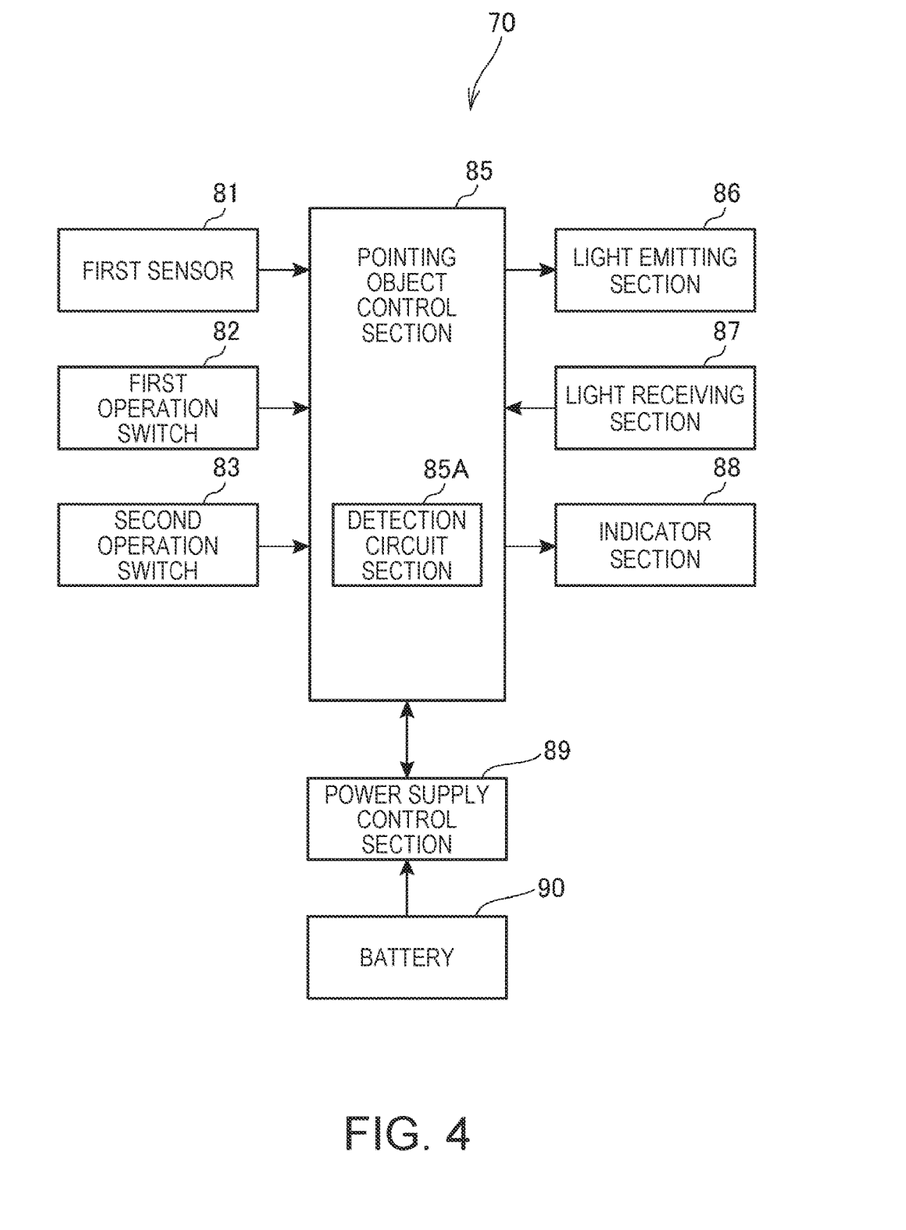
FIG. 4 is a functional block diagram of the pointing object.

FIG. 3 is an external view of the pointing object 70, and FIG. 4 is a functional block diagram of the pointing object 70. The pointing object 70 is formed to have a pen-like shape which can be held by the user with hand and used, and in other words, as shown in FIG. 3, the pointing object 70 is formed to have a shape integrally provided with a main body part 71 shaped like a rod to be held by the user and a tip part 72 having a tapered shape disposed one end of the main body part 71.

The pointing object 70 is provided with a first sensor 81 (FIG. 4) for detecting deformation of the main body part 71 due to external force. Further, the pointing object 70 is provided with a first operation switch 82 and a second operation switch 83 each functioning as an operation section to be operated by the user.

The first sensor 81 is formed of a strain sensor, and detects the strain generated when the user performs an action (a first action indicated by the symbol F1 in FIG. 3) of holding the main body part 71. The action of the user holding the main body part 71 includes an action of the user holding (or gripping) the main body part 71 like a pen.

Thus, the first sensor 81 functions as a first detection section for detecting that the main body part 71 is held (including "gripped") by the user.

The first operation switch 82 is a switch acting in accordance with the operation (a second action indicated by the symbol F2 in FIG. 3) of pressing the tip part 72 against the screen SC or the like. In the present embodiment, a holding-down switch housed in the tip part 72 is used as the first operation switch 82.

The user presses the tip part 72 of the pointing object 70 against the screen SC in the case of designating a position on the screen SC using the pointing object 70. Therefore, the first operation switch 82 is an operation section (a first operation section) operated in the case in which the user performs a pointing operation, and in other words, an operation section to be operated in the case in which the pointing object 70 is used as the pointing device. The operation of the first switch 82 is detected by a detection circuit section 85A of the pointing object 70. In other words, the detection circuit section 85A functions as a second detection section for detecting that the pointing operation is performed.

The second operation switch 83 is an operation section (a second operation section) operated in the case in which the user performs a predetermined operation other than the pointing operation. In the present embodiment, a holding-down switch disposed on a side surface of the main body part 71 so as to be able to be operated in the state in which the user holds the pointing object 70 (including the state in which the user grips the pointing object 70) is used as the second operation switch 83. Therefore, the second operation switch 83 acts in accordance with the holding down operation (a third action indicated by the symbol F3 in FIG. 3) of the user.

The operation of the second switch 83 is detected by the detection circuit section 85A of the pointing object 70. In other words, the detection circuit section 85A also functions as a third detection section for detecting that a predetermined operation other than the pointing operation is performed. The pointing assigned to the second operation switch 83 can arbitrarily be set.

It should be noted that as the first sensor 81, there can also be used a different sensor as long as the sensor can detect that the main body part 71 is held. For example, the first sensor 81 can be a capacitance type touch sensor (a so-called electrostatic sensor) for detecting a variation in the capacitance. Further, the first sensor 81 can also be an acceleration sensor, an angular velocity sensor, or a vibration sensor for respectively detecting the acceleration, an angular velocity, or a vibration caused by a motion of the user when the main body part 71 is held.

Further, the first operation switch 82 is not limited to the holding-down switch, but a different switch or a sensor (e.g., an electrostatic sensor) can be applied as long as the switch or the sensor can detect the operation (the second action indicated by the symbol F2 in FIG. 3) of pressing the tip part 72 against the screen SC or the like.

Further, the second operation switch 83 is also not limited to the holding-down switch, but a different switch or a sensor (e.g., an electrostatic sensor) capable of detecting the operation of the user can also be applied.

As shown in FIG. 4, the pointing object 70 is further provided with a pointing object control section 85, a light emitting section 86, a light receiving section 87, an indicator section 88, a power supply control section 89, and a battery 90.

The light emitting section 86 has a light source for emitting the infrared light, and emits or stops emitting the infrared light in accordance with a predetermined light emission pattern during the period in which the pointing object 70 is acting in the normal operation mode described later under the control of the pointing object control section 85. The pointing object 70 emits the light (a wireless signal) of the light emitting section 86 from the tip part 72, and thus, the light emission pattern and the pointing position of the pointing object 70 are detected by the pointing object detection section 54 of the projector 10. The light emission pattern is used for discrimination and so on of the holding-down states of the first operation switch 82 and the second operation switch 83. Specifically, the pointing object control section 85 lights the light emitting section 86 with different light emission patterns in accordance with the holding-down states of the first operation switch 82 and the second operation switch 83. It should be noted that the infrared light is the light outside the visible range, and is therefore not visually be recognized by the user. It should be noted that there is no need to limit the light to the infrared light.

The light receiving section 87 receives the light (the infrared light in this configuration) having been emitted from the transmitting section 52 provided to the projector 10, and then outputs the signal representing the reception result to the pointing object control section 85. The pointing object control section 85 controls the light emission timing of the light emitting section 86 based on the reception result to synchronize the light emission timing of the light emitting section 86 with the detection timing by the pointing object detection section 54 of the projector 10.

The indicator section 88 has a light source such as an LED provided to the main body part 71 of the pointing object 70, and emits or stops emitting visible light under the control by the pointing object control section 85. The visible light can visually be recognized from the outside via the window part 71A provided to the main body part 71. The indicator section 88 emits light in, for example, the case in which the light emitting section 86 is operating, or the case in which the pointing object 70 is in the normal operation mode, and can thus inform the user of predetermined information.

The power supply control section 89 supplies each of the sections of the pointing object 70 with the electrical power of the battery 90 under the control by the pointing object control section 85. The battery 90 is a primary cell or a secondary cell. It should be noted that in the case in which the battery 90 is the secondary cell, the pointing object 70 can also be provided with a function of charging the battery using external power (e.g., the electricity from the commercial power supply).

The pointing object control section 85 is constituted by an arithmetic processing circuit such as a CPU, and a peripheral circuit of the CPU. The pointing object control section 85 centrally controls each of the sections of the pointing object 70, and at the same time, performs a variety of types of arithmetic processing for realizing a function (a timer function) of a countdown timer and so on. Further, the pointing object control section 85 also performs the control of switching the operation mode of the pointing object 70 between the normal operation mode and the power saving mode.

Here, the normal operation mode is an operation mode (a first operation mode) of operating in an operation state suitable for the usage, and is an operation state higher in power consumption compared to the power saving mode.

Further, the power saving mode is an operation mode (a second operation mode) with the power consumption saved compared to the first operation mode (including the normal operation mode) suitable for the usage. In the present embodiment, the power saving mode is an operation state in which the detection operation related to at least the first sensor 81, the first operation switch 82, and so on is performed, and at the same time, only the circuit section (the detection circuit section 85A in FIG. 4) having the timer function is operated. It should be noted that the detection circuit section 85A can be an IC chip packaged, or can also be a plurality of circuits not packaged.

More specifically, in the case of the normal operation mode in the present embodiment, the pointing object control section 85 supplies each of the sections of the pointing object 70 with the operation power using the power supply control section 89 to make all of the functions of the pointing object 70 available. Thus, the pointing object control section 85 performs the actions related to the first sensor 81, the first operation switch 82, and the second operation switch 83. Further, the pointing object control section 85 makes the light emitting section 86 repeatedly emit the light with a predetermined light emission pattern to thereby transmit an infrared signal (a wireless signal) to the projector 10 as an external device. Further, the pointing object control section 85 performs a process for achieving synchronization based on the reception result of the light receiving section 87, a process of notifying the user using the indicator section 88, a timer process and so on.

It should be noted that the actions related to the first sensor 81, the first operation switch 82, and the second operation switch 83 are actions of detecting the first through third actions F1 through F3 of the user based on the output signals of the first sensor 81, the first operation switch 82, and the second operation switch 83, and then performing the corresponding processes.

In the case of the power saving mode, only the detection circuit section 85A operates with the electrical power from the battery 90. Therefore, the power consumption is reduced compared to the normal operation mode. In this case, it is preferable to achieve the reduction of the power consumption by performing a process of dropping the operation voltage, a process of decreasing the operation clock rate, or the like. Further, besides the operation mode in which only the detection circuit section 85A operates, other sections can also operate as long as the power consumption is lower than in the normal operation mode.

Incidentally, there is a possibility that it becomes unachievable for the first sensor 81 to detect the hold of the main body part 71 due to deterioration of the sensitivity or a change in the usage environment. In the case of adopting a configuration performing switching from the power saving mode to the normal operation mode in the case in which the hold of the main body part 71 is detected by the first sensor 81, there occurs a possibility that it becomes unachievable to perform switching to the normal operation mode in such a circumstance described above.

Therefore, in the present embodiment, it is arranged that even in the case in which the first sensor 81 does not detect that the main body part 71 has been held, control (mode switching control) of switching the operation mode is performed in the case in which it is detected that the first operation switch 82 is operated.

Figure 5:
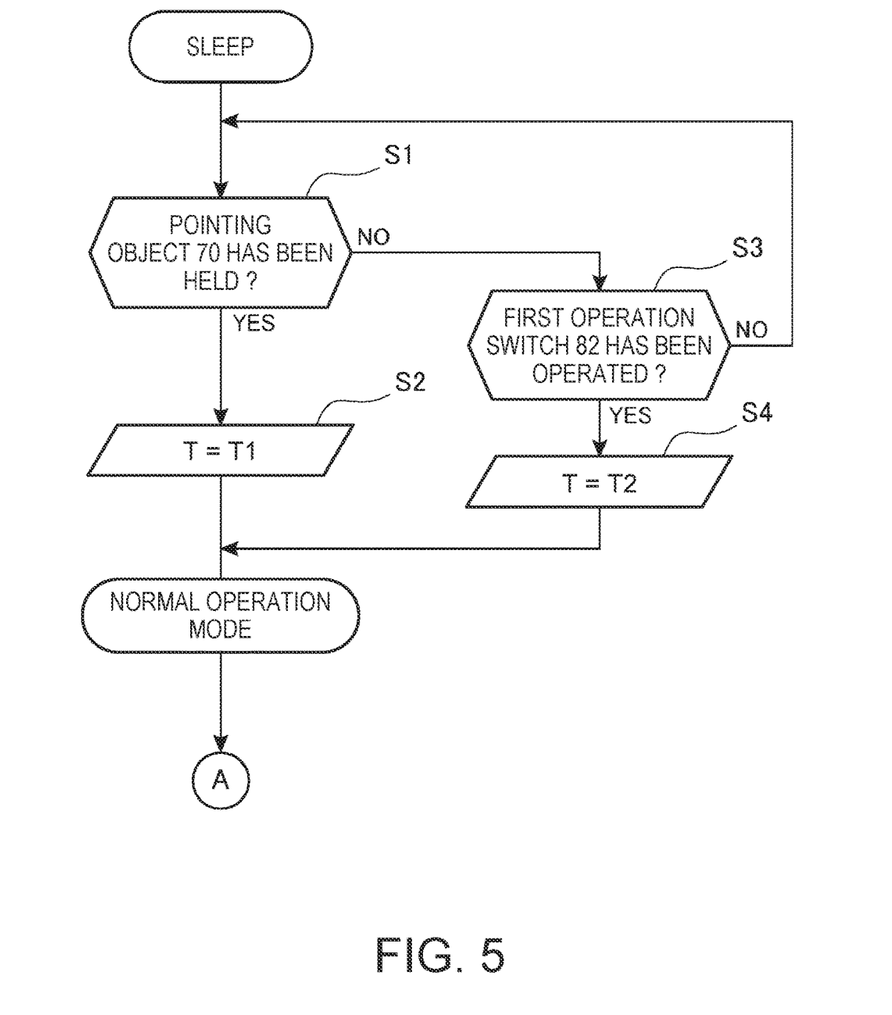
FIG. 5 is a flowchart showing an operation of mode switching control.
Figure 6:
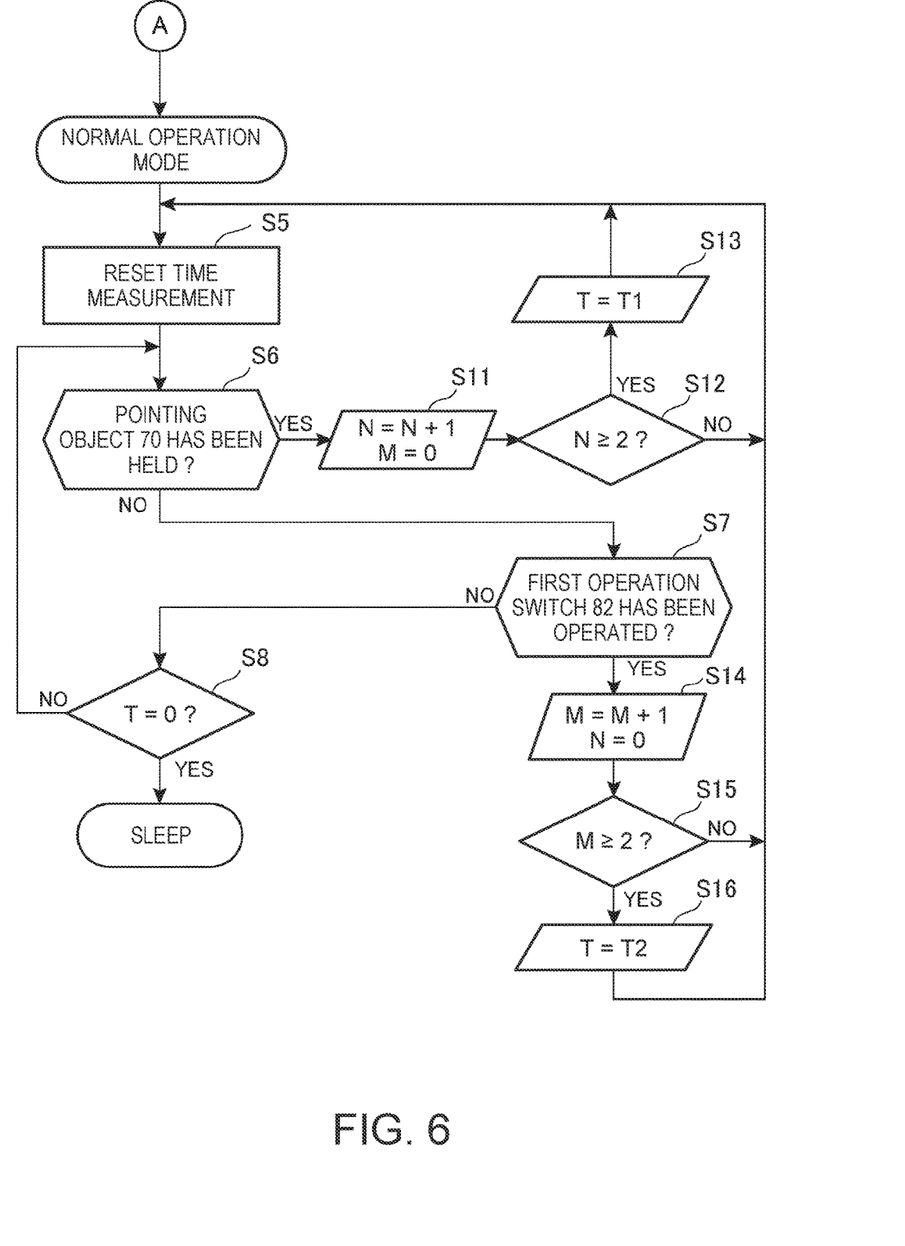
FIG. 6 is a flowchart following the flowchart shown in FIG. 5.

Hereinafter, the operation of the mode switching control will be described using the flowcharts shown in FIG. 5 and FIG. 6. It should be noted that FIG. 6 shows a flowchart following the flowchart shown in FIG. 5. In FIG. 5 and FIG. 6, the values T1, T2 are each waiting time until the transition to the power saving mode is completed wherein the second time T2 is longer than the first time T1 (T1<T2). Further, the values M, N are variables.

Here, in the case of the power saving mode ("Sleep" in FIG. 5), only the detection circuit section 85A of the pointing object control section 85 operates. Therefore, whether or not the pointing object 70 is held, and whether or not the first operation switch 82 is operated are monitored by the first sensor 81.

As shown in FIG. 5 and FIG. 6, if the first sensor 81 has detected that the pointing object 70 has been held in the case of the power saving mode (YES in the step S1), the detection circuit section 85A sets (step S2) the first time T1 as the timer time T. Subsequently, the detection circuit section 85A makes the transition to the normal operation mode.

After the transition to the normal operation mode, if the first time has elapsed (YES in the step S8) in the state (NO in the step S6, NO in the step S7) in which the hold of the pointing object 70 is not detected and the operation of the first operation switch 82 is also not detected, the pointing object control section 85 makes the transition to the power saving mode.

In other words, if the user once holds the pointing object 70 and then release the pointing object 70 from the hand without performing any operations, the transition to the power saving mode occurs after the first time T1 which is relatively short elapses. Thus, if the action (the first and second actions F1, F2 shown in FIG. 3) by the user does not occur in the normal operation mode, the transition to the power saving mode occurs in a short period of time, and thus, the reduction of the power consumption can efficiently be achieved. For example, by setting the first time T1 within a range of about several seconds, it is possible to switch the operation mode from the normal operation mode to the power saving mode within several seconds.

In contrast, if it has not been detected that the pointing object 70 has been held (NO in the step S1) and it has been detected that the first operation switch 82 has been operated (YES in the step S3), the detection circuit section 85A sets (step S4) the second time T2 as the timer time T. Subsequently, the detection circuit section 85A makes the transition to the normal operation mode.

In the normal usage condition, it is difficult for the user to operate the first operation switch 82 without holding the pointing object 70 by hand. Therefore, in the case in which the hold of the pointing object 70 has not been detected, and it has been detected that the first operation switch 82 has been operated, there is a possibility that sensing by the first sensor 81 has been unsuccessful due to the deterioration of the sensitivity, the change in usage environment, and so on.

In the present embodiment, in the case in which it has been detected that the hold of the pointing object 70 has not been detected and it has been detected that the first operation switch 82 has been operated (NO in the step S1, YES in the step S3), the pointing object control section 85 makes the transition to the power saving mode when the second time T2 elapses (YES in the step S8) after the transition to the normal operation mode in the state in which neither the hold of the pointing object 70 nor the operation of the first operation switch 82 has not been detected (NO in the step S6, NO in the step S7).

Thus, the user can continue the pointing operation with the pointing object 70 by pressing the pointing object 70 against the screen SC before the second time T2 elapses even in the case in which the sensing by the first sensor 81 is not successful. For example, by setting the second time T2 within a range from several tens of seconds to several minutes, the pointing operation with the pointing object 70 can be continued during the period. Therefore, it is possible to prevent the situation that switching to the power saving mode frequently occurs despite that the user holds the pointing object 70. Therefore, the usability for the user can be improved. Further, since the transition to the power saving mode occurs when the second time T2 elapses, the reduction of the power consumption can also be achieved.

Further, if it has not been detected that the pointing object 70 has been held (NO in the step S1) and it has also not been detected that the first operation switch 82 has been operated (NO in the step S3), the detection circuit section 85A makes the transition to the process in the step S1. Thus, the power saving mode continues. Therefore, in the case in which the pointing object 70 is not held, and the first operation switch 82 is not operated, the power saving mode continues to achieve the reduction of the power consumption.

The operation in the case of making the transition to the normal operation mode will be described in detail. Firstly, when making the transition to the normal operation mode, the pointing object control section 85 resets the variables M, N to zero as an initial value. Subsequently, the pointing object control section 85 resets the time measurement (countdown) by the timer function, and then starts (step S5) the time measurement of the timer time T set to the first time T1 or the second time T2. If it has been detected that the pointing object 70 has been held (YES in the step S6) in the case of the normal operation mode, the pointing object control section 85 increments the value N by a value of 1, and resets the value M to zero (step S11). Subsequently, the pointing object control section 85 determines whether or not the value N is equal to or greater than 2 (step S12).

In the case in which the value N is not equal to 2 and not greater than 2 (NO in the step S12), the pointing object control section 85 makes the transition to the process of the step S5. In contrast, in the case in which the value N is equal to or greater than 2 (YES in the step S12), the pointing object control section 85 sets (step S13) the first time T1 as the timer time T, and makes the transition to the process in the step S5.

In other words, in the case in which it has been detected twice in a row by the first sensor 81 in the normal operation mode that the pointing object 70 has been held, the first time T1 is set as the timer time T.

In the case in which it has been detected twice in a row by the first sensor 81 that the pointing object 70 has been held, it is conceivable that the sensing by the first sensor 81 is successful. Therefore, by setting the first time T1 which is relatively short, it is possible to promptly perform switching to the power saving mode in the case in which the pointing object 70 is not held (NO in the step S6) and the first operation switch 82 is not operated (NO in the step S7) for the first time T1.

As described above, in the case in which the sensing by the first sensor 81 is successful, if the action (the first and second actions F1, F2 shown in FIG. 3) by the user does not occur, the transition to the power saving mode occurs in a short period of time. Therefore, the reduction of the power consumption can be achieved without hindering the usability. Further, in the power saving mode, since the switching to the normal operation mode occurs only by the user holding the pointing object 70, good usability is obtained.

In contrast, in the case in which the hold of the pointing object 70 has not been detected, and it has been detected that the first operation switch 82 has been operated (NO in the step S6, YES in the step S7) in the normal operation mode, the pointing object control section 85 increments the value M by a value of 1, and resets the value N to zero (step S14). Subsequently, the pointing object control section 85 determines (step S15) whether or not the value M is equal to or greater than 2, and then makes the transition to the process in the step S5 in the case in which the value M is not equal to 2 and is not greater than 2 (NO in the step S15).

Further, in the case in which the value M is equal to or greater than 2 (YES in the step S15), the pointing object control section 85 sets (step S16) the second time T2 as the timer time T, and makes the transition to the process in the step S5.

Thus, in the case in which the sensing by the first sensor 81 is unsuccessful, if the operation of the first operation switch 82 has been detected twice in a row, there is set the long waiting time (the second time T2) until the transition to the power saving mode is made. Therefore, it is possible to prevent the situation that the switching to the power saving mode frequently occurs despite that the user holds the pointing object 70. Further, if the user presses the pointing object 70 against the screen SC before the second time T2 elapses, the normal operation mode continues, and the user can continue the pointing operation with the pointing object 70.

In contrast, if the user stops pressing the pointing object 70 against the screen SC, the transition to the power saving mode occurs after the second time T2 elapses. Therefore, both of the usability and the reduction of the power consumption can be achieved. The operation of the mode switching control is as described hereinabove.

As described hereinabove, the pointing object 70 according to the present embodiment is provided with the first sensor 81 (the first detection section) for detecting that the main body part 71 has been held, and the detection circuit section 85A (the second detection section) for detecting that the first operation switch 82 has been operated. Further, the pointing object control section 85 switches the operation mode based on the detection result of the first sensor 81 and the detection result of the first switch 82.

According to the configuration of the pointing object 70 and the method of controlling the pointing object 70, even in the case in which the sensing by the first sensor 81 is not completed due to the deterioration of the sensitivity and the change in the usage environment, it is possible to switch the operation mode using the detection result of the first operation switch 82. Therefore, it is possible to achieve the reduction of the power consumption while achieving the improvement of the usability.

Further, according to the configuration and the control method described above, in the case of the configuration of applying a touch sensor (an electrostatic sensor) as the first sensor 81, even if the user wears a pair of gloves, the operation mode can be switched.

Further, in the power saving mode, the pointing object control section 85 switches the operation mode to the normal operation mode in either of the case in which the first sensor 81 has detected that the main body part 71 has been held, and the case in which it has been detected that the first operation switch 82 has been operated. Thus, even in the case in which the sensing by the first sensor 81 is not completed, by operating the first switch 82 to thereby perform switching from the power saving mode to the normal operation mode, the pointing object 70 becomes available to the user.

Further, in the normal operation mode, the pointing object control section 85 performs switching to the power supply mode after the timer time T (the first time T1 or the second time T2) elapses in the state in which it is not detected that the main body part 71 is held, and the operation of the first operation switch 82 is also not detected. Thus, in the case in which the user does not use the pointing object 70, it is possible to perform switching to the power saving mode after the timer time T (predetermined time) elapses. Therefore, the reduction of the power consumption can be achieved.

Further, the pointing object control section 85 sets the first time T1 as the timer time T in the case in which it has been detected that the main body part 71 has been held, and sets the second time T2 longer than the first time T1 as the timer time T in the case in which it has not been detected that the main body part 71 has been held, and it has been detected that the first operation switch 82 has been operated, in other words, in the case in which the sensing by the first sensor 81 is unsuccessful. Thus, it is possible to prevent that the pointing object 70 frequently enters the power saving mode despite that the user holds the main body part 71. Therefore, it becomes advantageous to the improvement in usability. It should be noted that the first time T1 and the second time T2 can freely be set by the user or the like.

Further, the second time T2 is set as the timer time T if the condition, in which the hold of the main body part 71 is not detected, and the operation of the first operation switch 82 is detected, occurs a plurality of times in a row, and the first time T1 is set as the timer time T if the condition, in which the hold of the main body part 71 is detected, occurs a plurality of times in a row. Therefore, it is possible to prevent the timer time T from being switched only by each of the conditions having incidentally occurred only once. It should be noted that the number of times necessary for setting the first time T1 or the second time T2 is not limited to two, but can also be set to three or more. Alternatively, the number of times is not limited to a plural number, but can also be set to one.

Further, the first sensor 81 is a strain sensor for detecting the strain of the main body part 71, and can therefore accurately detect whether or not the main body part 71 is held (including "gripped") by the user.

Further, in the case of using an acceleration sensor for detecting the acceleration of the main body part 71 as the first sensor 81, the acceleration caused by the motion of the user, who holds the main body part 71, can be detected using the acceleration sensor, and whether or not the main body part 71 is held (including "gripped") by the user can accurately be detected.

Further, as the first sensor 81, there can be used an electrostatic sensor for detecting a variation in the capacitance. It should be noted that in the case of using the electrostatic sensor, if the user wears a pair of gloves, it becomes difficult to detect the hold of the main body part 71. However, by operating the first operation switch 82, switching of the operation mode can be performed.

Further, it is also possible for the first sensor 81 to have a plurality of sensors such as the strain sensor described above and the acceleration sensor. Thus, it becomes easy to increase the accuracy of the detection of whether or not the main body part 71 is held.

Further, the pointing object 70 is provided with the light emitting section 86 (transmitting section) for transmitting the infrared signal (the wireless signal) to the projector 10 as the external device, and in the case in which the operation mode has been switched to the normal operation mode, the light emitting section 86 becomes to be able to transmit the infrared signal. Thus, in the case of the normal operation mode, it becomes possible to transmit the infrared signal to the projector 10 to thereby perform the position detection and identification of the pointing object 70.

The embodiment described above is for showing the preferred embodiment of the invention, but does not limit the invention, and a variety of modified implementations can be made within the scope or the spirit of the invention. For example, in the embodiment described above, the configuration of the pointing object 70 shown in FIG. 4 is for showing the functional configuration, and the specific implementation forms are not particularly limited. For example, although in the embodiment described above, there is described the case in which the pointing object control section 85 of the pointing object 70 is provided with the circuit section (a part of the detection circuit section 85A) functioning as the second detection section for detecting whether or not the pointing operation is performed, it is also possible for the circuit section to be separate from the pointing object control section 85.

In the embodiment described above, although the operation mode is switched or the time at which switching from the normal operation mode to the power saving mode is performed is changed based on the detection result of the first sensor 81 and the detection result of the first operation switch 82, it is also possible to arrange that those are based on the detection result of the second operation switch 83 instead of the detection result of the first operation switch 82, or it is also possible to arrange that those are based on both of the detection results of the first operation switch 82 and the second operation switch 83. In other words, it is also possible to arrange that in the power saving mode, the second time T2 is set as the timer time T, and the switching to the normal operation mode is performed in the case in which the operation of the first operation switch 82 or the second operation switch 83 has been detected while the hold of the main body part 71 has not been detected, and in the normal operation mode, the second time T2 is set as the timer time T in the case in which the condition, in which the operation of the first operation switch 82 or the second operation switch 83 is detected while the hold of the main body part 71 is not detected, occurs twice in a row.

Further, although in the embodiment described above, there is illustrated the case in which the pointing object 70 has a pen-like shape, the shape of the pointing object 70 is not limited to the pen-like shape, and the shape and the size of the pointing object 70 are not particularly limited. Further, a part or the whole of the function realized by hardware in the embodiment described above can also be realized by software.

Further, although in the embodiment described above, there is described the case of applying the invention to the pointing object 70 used in the projection system 1, the invention is not limited to this case. In essence, the invention can widely be applied to an electronic device which has a main body part 71 held by the user when used, and in which the operation mode can be switched between the first operation mode (not limited to the normal operation mode) suitable for the usage and the power saving mode as the second operation mode with the power consumption suppressed.

The electronic device other than the pointing object 70 is a portable device such as a remote controller or a digital camera held (including "gripped") by the user when used.

What is claimed is:

1. An electronic device having a main body part to be held by a user, comprising:
   a first detection section adapted to detect that the main body part has been held;
   an operation section adapted to accept an operation;
   a second detection section adapted to detect that the operation section has been operated; and
   a control section capable of switching an operation mode of the electronic device between a first operation mode in which the electronic device operates in an operation state suitable for a usage, and a second operation mode with a power consumption reduced to a level lower than in the first operation mode, and adapted to switch the operation mode based on a detection result of the first detection section and a detection result of the second detection section.

2. The electronic device according to claim 1, wherein the control section switches the operation mode to the first operation mode in a case in which the first detection section has detected that the main body part has been held, and in a case in which the second detection section has detected that the operation section has been operated in the second operation mode.

3. The electronic device according to claim 1, wherein the control section switches the operation mode to the second operation mode in a case in which predetermined time has elapsed in a state in which the first detection section has failed to detected that the main body part has been held, and the second detection section has failed to detect that the operation section has been operated in the first operation mode.

4. The electronic device according to claim 3, wherein the control section sets first time as the predetermined time in a case in which the first detection section has detected that the main body part has been held, and sets second time longer than the first time as the predetermined time in a case in which the first detection section has failed to detect that the main body part has been held, and the second detection section has detected that the operation section has been operated.

5. The electronic device according to claim 1, wherein the first detection section has a strain sensor adapted to detect strain of the main body part.

6. The electronic device according to claim 1, wherein the first detection section has an acceleration sensor adapted to detect acceleration of the main body part.

7. The electronic device according to claim 1, wherein the first detection section has an electrostatic sensor adapted to detect a variation of a capacitance.

8. The electronic device according to claim 1, further comprising:
a transmitting section adapted to transmit a wireless signal to an external device,
wherein the transmitting section becomes to be able to transmit the wireless signal in a case in which the control section has switched the operation mode to the first operation mode.

9. A method of controlling an electronic device having a main body part to be held by a user, comprising:
performing control of switching an operation mode between a first operation mode in which the electronic device operates in an operation state suitable for a usage, and a second operation mode with a power consumption reduced to a level lower than in the first operation mode; and
switching the operation mode based on a detection result of the first detection section adapted to detect that the main body part has been held, and a detection result of the second detection section adapted to detect that an operation section has been operated.

* * * * *